Sept. 2, 1930.   C. E. SWENSON   1,774,679
UNIVERSAL JOINT ASSEMBLY
Filed April 5, 1929   2 Sheets-Sheet 1

Inventor:
Carl E. Swenson
By Wilson & McCanna
Attys.

Sept. 2, 1930.　　　C. E. SWENSON　　　1,774,679
UNIVERSAL JOINT ASSEMBLY
Filed April 5, 1929　　2 Sheets-Sheet 2

Inventor:
Carl E. Swenson
By Wilson & McCanna
Attys.

Patented Sept. 2, 1930

1,774,679

UNITED STATES PATENT OFFICE

CARL E. SWENSON, OF ROCKFORD, ILLINOIS, ASSIGNOR TO MECHANICS UNIVERSAL JOINT CO., OF ROCKFORD, ILLINOIS, A CORPORATION OF ILLINOIS

UNIVERSAL-JOINT ASSEMBLY

Application filed April 5, 1929. Serial No. 352,665.

This invention relates to universal joint assemblies, such as are required in front wheel drives for automobiles, where two universal joints are built into one assembly.

In a universal joint assembly of this kind a ball and socket joint is required to connect the driving yoke member of the one universal with the driven yoke member of the other universal to keep them in centered relation with one another, and it is also important that this centering joint be kept well lubricated and sealed against the entry of grit and dirt. Now, owing to the amount of relative movement of the parts, the enclosing of the joint presents quite a problem. So far as I am aware, these joints have commonly been enclosed by boots of leather or rubberized material. These boots would not give much service before being bruised or ruptured by getting pinched between the yoke members in certain positions assumed in operation. It is, therefore, the principal object of my invention to provide a ball and socket joint for the centering purpose referred to, which is so designed that the use of a boot or the like is rendered unnecessary and a well packed and sealed joint is afforded, no part of which is apt to fail or develop mechanical troubles and require any attention whatever before any other part of the assembly.

Briefly stated, I provide a centering joint connecting the two yoke members of the two universals consisting of a ball rotatably received in a spheroidal socket in the one yoke member and a stem on the other yoke member having a close working fit in a center hole provided in the ball. Packing material is compressed in the entry end of the hole about the stem, as for example, by means of a coiled compression spring fitted about the stem. This spring also serves to hold the ball in place in the socket. In addition, there is packing material compressed by a gland nut into close wiping contact with the surface of the ball. The packing at these two points prevents the loss of lubricant as well as the entry of grit and dirt.

The above and other features of my invention will be brought out in the course of the following detailed description, in which reference is made to the accompanying drawings, wherein—

Figure 1:
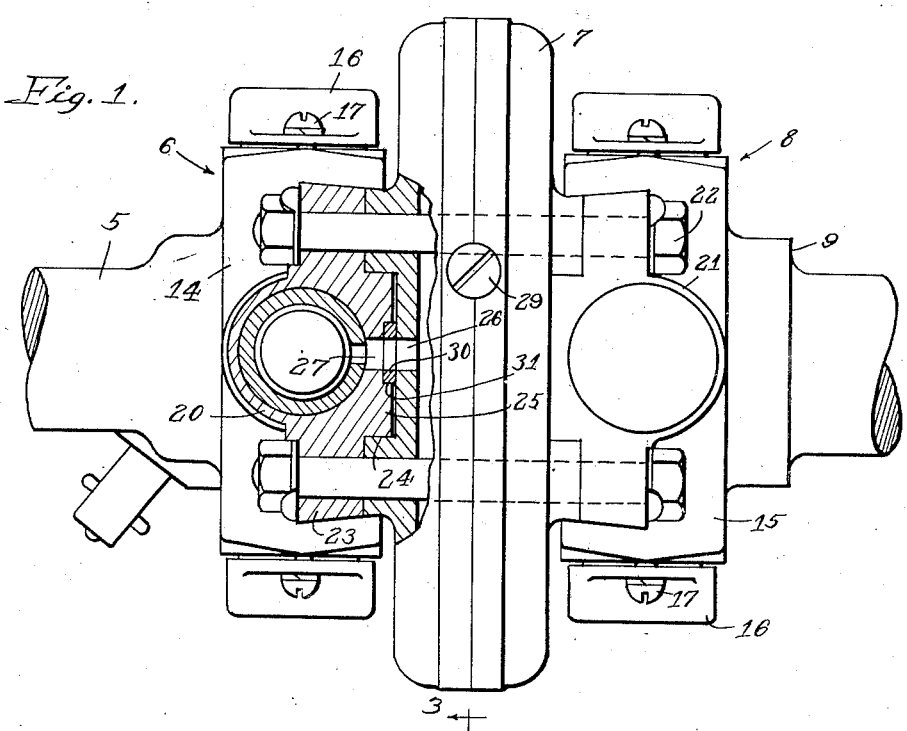
Figure 1 is a side view of a universal joint assembly in connection with which my invention is employed, a part of the joint being shown in section to illustrate an oil sealing feature.
Figure 2:
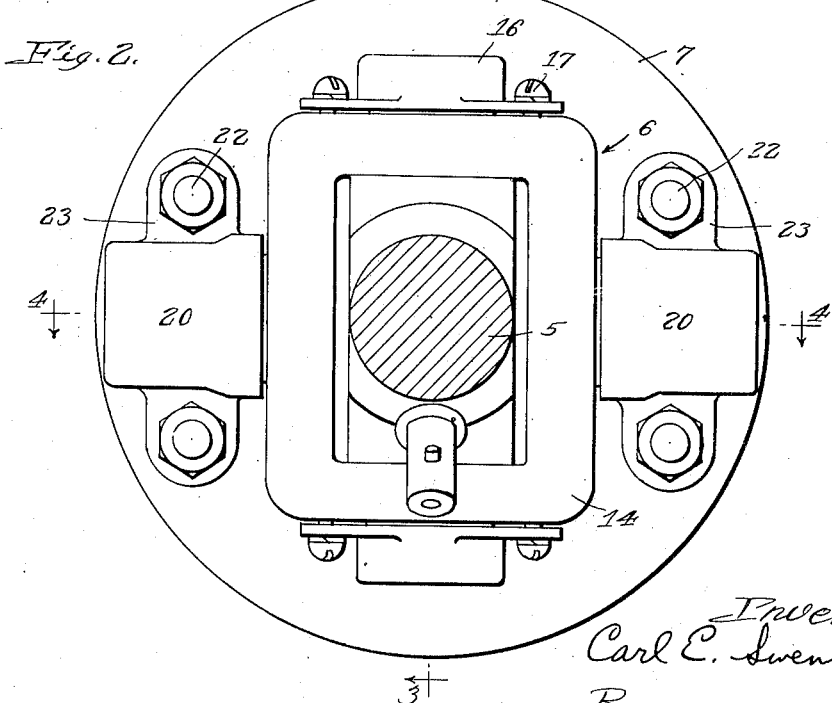
Fig. 2 is a view looking at the left hand end of Fig. 1.
Figure 3:
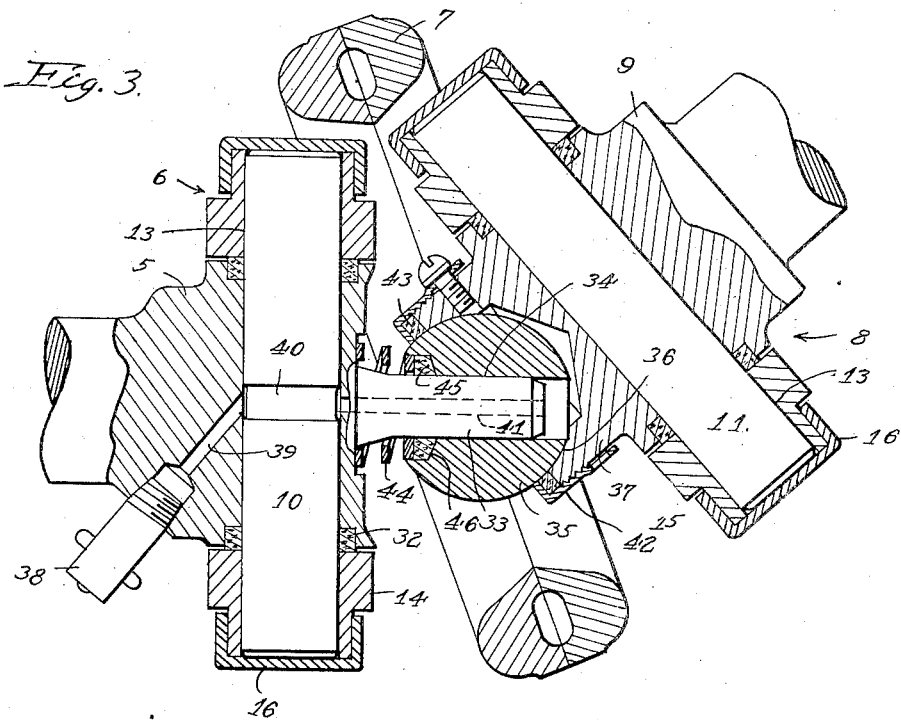
Figure 4:
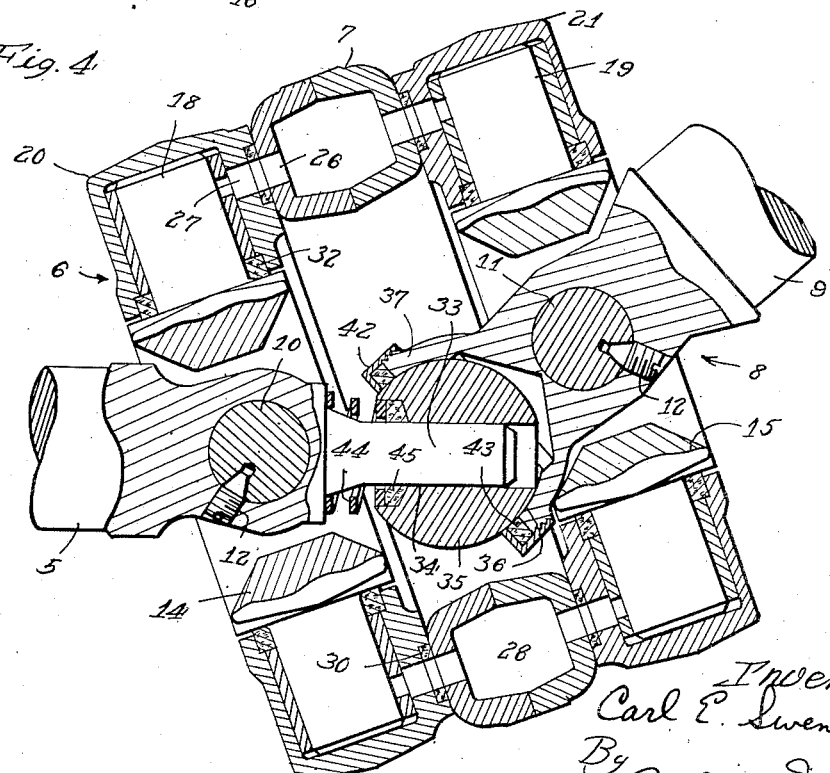

Fig. 3 is a central, vertical, longitudinal section through the assembly, corresponding to a section on the line 3—3 of Fig. 2, such view serving to show the centering joint made in accordance with my invention, and Fig. 4 is a horizontal section through the assembly, corresponding to a section on the line 4—4 of Fig. 2. Figs. 3 and 4 show the yoke members in limit positions of angularity, it being understood, of course, that in actual service the parts will not be expected to be brought to quite such extreme positions.

The same reference numerals are applied to corresponding parts throughout the views.

In a universal joint assembly of the kind herein contemplated, the part designated by the reference numeral 5 represents the driving yoke member of one of the two universal joints designated generally by the reference numeral 6. The latter is connected by means of an intermediate transmission ring 7 with another universal joint designated generally by the reference numeral 8, the part numbered 9 being the driven yoke member of the latter joint. An assembly of this kind, generally speaking, is well known. The yokes 5 and 9 have cross pins 10 and 11 mounted therein and suitably secured against endwise movement by means of set screws 12. The ends of these cross pins serve as trunnions received in bearings 13 in transmission rings 14 and 15 related to the yokes 5 and 9 respectively. The rings 14 and 15 are small enough to permit of their swinging into such positions as shown in Fig. 3 inside the ring 7. Caps 16 covering the ends of the bearings 13 are suitably secured in place by means of screws 17. Trunnions 18 and 19 are formed integral with the rings 14 and 15, respectively, in right angular relation to the trunnions provided by the ends of the cross pins 10 and 11. These trunnions 18 and 19 are suitably received in bearings 20 and 21, respectively, fastened to the opposite sides of the ring 7 by means of through bolts 22 passed through ears 23 suitably formed integral with said bearings. The ring 7 is usually made in two halves, each of which is annular in form with a channel-shaped cross-section, as is best evident in Figs. 3 and 4. Each of these halves is milled transversely on the outer face thereof to provide slots 24 snugly to receive bosses 25 formed on the abutting face of the bearings 20 and 21, whereby definitely to locate the bearings with reference to the ring 7 and facilitate the assembling of the bearings on the ring and the fastening thereto by means of the bolts. Oil holes 26 are provided in the side walls of the ring 7 in registering relation with oil holes 27 provided in the bearings and serve to establish communication between the bearings and the annular oil reservoir 28 provided inside the ring 7. A removable plug 29 affords communication to the reservoir 28. Gaskets 30 of cork or other suitable compressible material are placed in counterbores 31 provided for the purpose in the outer ends of the oil holes 27, and are arranged to be compressed between the bearings and the ring 7 in the fastening of the bearings thereto, thus making an absolutely oil-tight connection. Gaskets 32 provided in connection with all of the trunnions serve a similar purpose.

The centering joint for keeping the yokes 5 and 9 in centered relation to one another comprises, generally speaking, an axial stem 33 projecting from the one yoke member, in this case the yoke 5, and reciprocable in a center hole 34 in a ball 35 mounted in a spheroidal socket 36 provided on the other yoke member, in this case the yoke 9. The ball 35 has a close working fit in the socket 36 which is provided in a cylindrical boss 37 formed integral with the yoke 9. There is enough surface contact between the ball and socket to assume the loads imposed on the centering joint in service without the likelihood of appreciable wear except only after very long service, especially if lubrication of the joint has not been neglected. A lubricator nipple 38 is provided on the yoke 5 communicating with a passage 39 drilled in said yoke to a point where communication is established with an annular groove 40 provided intermediate the ends of the cross pin 10. The annular groove 40 establishes communication with an oil hole 41 drilled through the stem 33 and communicating with the socket 36 through the inner end of the center hole 34 in the ball 35. A gland nut or ball retainer 42 threading on the externally threaded outer end of the boss 37 retains the ball in the socket and compresses packing material 43 into close wiping contact with the surface of the ball 35 so that there will be practically no loss of lubricant from the socket, nor, on the other hand, any danger of the entry of grit and dirt. A helical compression spring 44, fitting about the base of the stem 33 and bearing against the yoke 5, serves to hold the ball 35 in place in the socket 36 and at the same time serves to compress packing 45 in a counterbore 46 provided therefor in the outer end of the center hole 34 in the ball 35, to insure close wiping contact of the packing with the stem 33 so as to seal the outer end of the center hole 34 against loss of lubricant or entry of grit and dirt.

In the operation of the universal joint assembly, it should be evident that the stem 33 will slide in the bore 34 as the yokes 5 and 9 move with respect to one another. The centers of the cross pins 10 and 11 and the center of the ball 35 are brought in line when the yokes 5 and 9 are in alignment, but are otherwise out of alignment, as best appears in Fig. 4, so that the necessity for the sliding connection must be evident. The spring 44 is compressed slightly when the yokes move into alignment and expands slightly as the yokes move out of alignment. Other than that; there is no part of the centering joint subjected to any distortion whatever in the operation of the assembly and, of course, it goes without saying that there is nothing which in any position of the two yokes can possibly be damaged by contact with the yokes, as was the case where the boots were used, as above described.

It is believed that the foregoing description conveys a clear understanding of my invention. The appended claims have been drawn with a view to affording a degree of protection commensurate with the novelty presented.

I claim:

1. In a universal joint assembly, the combination with a pair of universal joints, each comprising a yoke pivotally connected with a transmission ring, and an intermediate transmission member providing a driving connection between the rings of said joints on parallel axes at right angles to the aforesaid pivots, of means for centering the driving yoke member of the one joint with the driven yoke member of the other joint in all positions which the one member may assume with respect to the other in operation, comprising a ball, a central spheroidal socket provided in the one yoke member for swivel reception of said ball, said ball having a center hole provided therein, and a central axial stem projecting from the other yoke member and slidably received in the center hole.

2. In a universal joint assembly, the combination with a pair of universal joints, and an intermediate transmission member providing a driving connection between said joints, of means for centering the driving yoke member of the one joint with the driven yoke member of the other joint in all positions which the one member may assume with respect to the other in operation, comprising a ball, a central spheroidal socket provided in the one yoke member for swivel reception of said ball, means for retaining the ball in said socket, said ball having a center hole provided therein, and a central axial stem projecting from the other yoke member and slidably received in the center hole, the said socket constituting a lubricant reservoir, the center hole in said ball extending entirely therethrough whereby to afford communication between the stem and socket, and packing means on said ball at the outer end of said hole serving by close wiping contact with the stem to prevent the escape of lubricant or the entry of grit and dirt.

3. In a universal joint assembly, the combination with a pair of universal joints, and an intermediate transmission member providing a driving connection between said joints, of means for centering the driving yoke member of the one joint with the driven yoke member of the other joint in all positions which the one member may assume with respect to the other in operation, comprising a ball, a central spherical socket provided in the one yoke member for swivel reception of said ball, said ball having a center hole provided therein, and a central axial stem projecting from the other yoke member and slidably received in the center hole, the said socket constituting a lubricant reservoir, and a retainer on the first mentioned yoke member and encircling the ball in said socket, packing material retained thereby in close wiping contact with the surface of said ball serving to prevent the escape of lubricant from said socket or the entrance of grit and dirt, the center hole in said ball extending entirely therethrough whereby to afford communication between the stem and the socket, and packing means on said ball at the outer end of said hole serving by close wiping contact with the stem to prevent the escape of lubricant or the entry of grit or dirt.

4. An assembly as set forth in claim 3 wherein the outer end of said center hole is counterbored to receive the packing material, and including a coiled compression spring fitting about the base of said stem and engaging the packing to compress the same in place in close wiping contact with the stem to prevent the escape of lubricant or the entry of grit and dirt.

5. In a universal joint assembly, the combination with a pair of universal joints, and an intermediate transmission member providing a driving connection between said joints, of means for centering the driving yoke member of the one joint with the driven yoke member of the other joint in all positions which the one member may assume with respect to the other in operation, comprising a ball, a central spheroidal socket provided in the one yoke member for swivel reception of said ball, said ball having a center hole provided therein, and a central axial stem projecting from the other yoke member and slidably received in the center hole in said ball extending entirely therethrough for communication at its inner end with the inside of said socket, a lubricant passage provided in said stem extending lengthwise thereof for communication with the inside of said socket, and means communicating with the outer end of said passage for supplying lubricant thereto.

6. In a universal joint assembly, the combination with a pair of universal joints, and an intermediate transmission member providing a driving connection between said joints, of means for centering the driving yoke member of the one joint with the driven yoke member of the other joint in all positions which the one member may assume with respect to the other in operation, comprising a ball, a central spheroidal socket provided in the one yoke member for swivel reception of said ball, said ball having a center hole provided therein, and a central axial stem projecting from the other yoke member and slidably received in the center hole, the said socket constituting a lubricant reservoir and the center hole in said ball extending entirely therethrough for communication at its inner end with the inside of said socket, a lubricant passage provided in said stem extending lengthwise thereof for communication with the inside of said socket, means communicating with the outer end of said passage for supplying lubricant thereto, packing means for said socket serving to retain lubricant therein and exclude dirt and grit therefrom, and packing means for said ball at the outer end of said center hole serving to prevent the escape of lubricant or the entrance of grit or dirt.

7. In a universal joint assembly, the combination of a driving yoke member, a driven yoke member, the one yoke member forming part of one universal joint and the other a part of another universal joint, said yoke members having diametrically opposed trunnions all of which are disposed in the same plane, a transmission ring associated with each yoke member having diametrically opposed bearings receiving said trunnions, each of said transmission rings having a pair of diametrically opposed trunnions in a plane at right angles to the diametrically opposed bearings, an intermediate transmission ring common to the two joints having a pair of diametrically opposed bearings on both sides thereof for reception of the last mentioned trunnions, the first mentioned transmission rings being small enough to assume positions within the last mentioned ring in operation, and means within the last mentioned ring providing a centering joint connection between the yoke members comprising a central axial stem projecting from one yoke member toward the other, a ball having a center hole provided therein for slidably receiving said stem, and a central spheroidal socket provided in the other yoke member having said ball swiveled therein, said socket having means for retaining the ball therein.

8. In a universal joint assembly, the combination with a pair of universal joints, and an intermediate transmission member providing a driving connection between said joints, of means for centering the driving yoke member of the one joint with the driven yoke member of the other joint in all positions which the one member may assume with respect to the other in operation, comprising a ball, a central spheroidal socket provided in the one yoke member for swivel reception of said ball, said ball having a center hole provided therein, a central axial stem projecting from the other yoke member and slidably received in the center hole, and a spring fitting about the base of the stem on the last mentioned yoke member and engaging the ball to retain the same in the socket.

9. In a universal joint assembly the combination with a pair of universal joints, and an intermediate transmission member providing a driving connection between said joints, of means for centering the driving yoke member of the one joint with the driven yoke member of the other joint in all positions which the one member may assume with respect to the other in operation, comprising a ball, a central spheroidal socket provided in the one yoke member for swivel reception of said ball, said ball having a center hole provided therein, a central axial stem projecting from the other yoke member and slidably received in the center hole, the said socket constituting a lubricant reservoir, packing means on said ball at the outer end of said hole serving by close wiping contact with the stem to prevent the escape of lubricant or the entry of grit or dirt, and a spring fitting about the base of the stem on the last mentioned yoke member and engaging the packing to press the same in place.

10. In a universal joint assembly, the combination with a pair of universal joints, and an intermediate transmission member providing a driving connection between said joints, of means for centering the driving yoke member of the one joint with the driven yoke member of the other joint in all positions which the one member may assume with respect to the other in operation, comprising a ball, a central spheroidal socket provided in the one yoke member for swivel reception of said ball, a ring mounted on said yoke member for retaining the ball in said socket, said ring having contact with the ball in a narrow band annularly thereof and immediately next to a diametrical plane therethrough, said ball having a center hole provided therein, a central axial stem projecting from the other yoke member and slidably received in the center hole, the said socket constituting a lubricant reservoir, packing means on said ball on the outer end of said hole serving by close wiping contact with the stem to prevent the escape of lubricant or the entry of grit or dirt, and a spring fitting about the base of the stem on the last mentioned yoke member and engaging the packing to press the same in place and at the same time press the ball to its seat in the socket so as to aid the aforesaid ring in retaining the ball.

11. In a universal joint assembly, the combination with a pair of universal joints, and an intermediate transmission member providing a driving connection between said joints, of means for centering the driving yoke member of the one joint with the driven yoke member of the other joint in all positions which the one member may assume with respect to the other in operation, comprising a ball, a central spheroidal socket provided in the one yoke member for swivel reception of said ball, said ball having a center hole provided therein, and a central axial stem projecting from the other yoke member and slidably received in the center hole, the said socket constituting a lubricant reservoir and the center hole in said ball extending entirely therethrough for communication at its inner end with the inside of said socket, a lubricant passage provided in said stem extending lengthwise thereof for communication with the inside of said socket, means communicating with the outer end of said passage for supplying lubricant thereto, packing means for said socket serving to retain lubricant therein and exclude dirt and grit therefrom packing means for said ball at the outer end of said center hole serving to prevent the escape of lubricant or the entrance of grit or dirt, and a coiled compression spring fitting about the base portion of the stem and engaging the last mentioned packing means to serve the double function of pressing the latter into place on the ball and holding the ball in place in the socket.

12. In a universal joint assembly, the combination with a pair of universal joints, and an intermediate transmission member providing a driving connection between said joints, of means for centering the driving yoke member of the one joint with the driven yoke member of the other joint in all positions which the one member may assume with respect to the other in operation, comprising a ball, a central spheroidal socket provided in the one yoke member for swivel reception of said ball, a ring mounted on said yoke member for retaining the ball in said socket, the same having only narrow contact annularly of the ball next to a diametrical plane therethrough, said ball having a center hole provided therein, a central axial stem projecting from the other yoke member and slidably received in the center hole, and a spring fitting about the base of the stem on the last mentioned yoke member and engaging the ball, whereby to prevent binding contact between the aforesaid ring and the ball and aid the ring in retaining the ball in the socket.

In witness of the foregoing I affix my signature.

CARL E. SWENSON.